Figures 1, 2, 3:
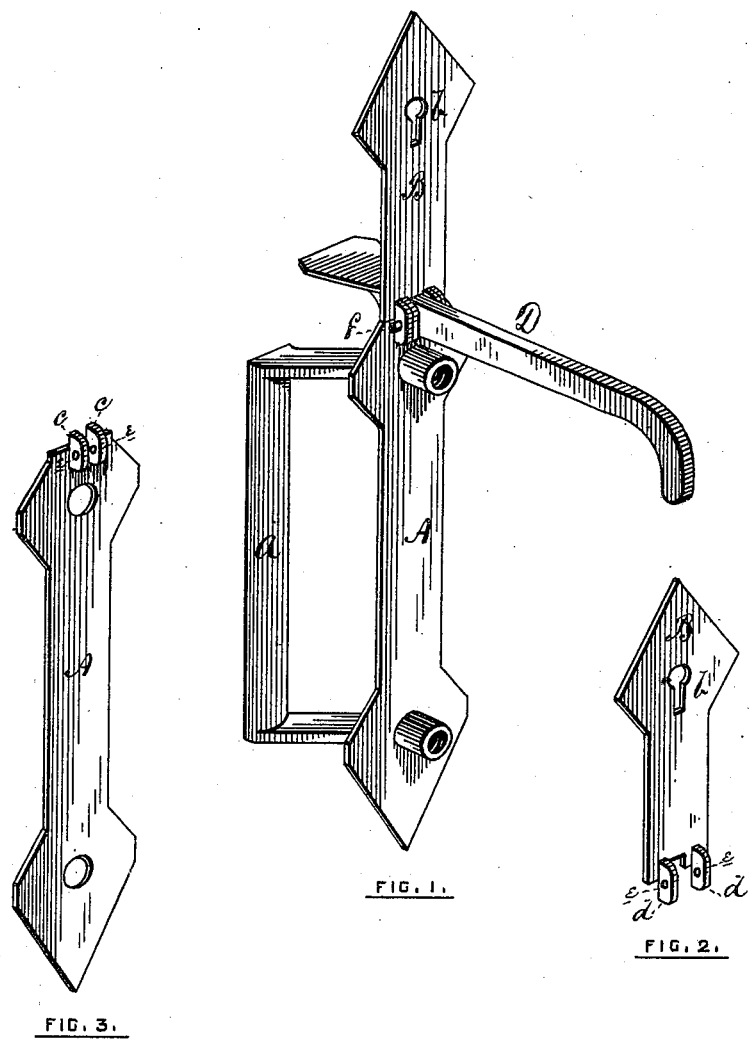

W. GORMAN.
HANDLE-PLATES FOR DOOR-LATCHES.

No. 174,626. Patented March 14, 1876.

WITNESSES.

INVENTOR
William Gorman.

UNITED STATES PATENT OFFICE.

WILLIAM GORMAN, OF NEW BRITAIN, CONNECTICUT, ASSIGNOR TO THE RUSSELL & ERWIN MANUFACTURING COMPANY, OF SAME PLACE.

IMPROVEMENT IN HANDLE-PLATES FOR DOOR-LATCHES.

Specification forming part of Letters Patent No. 174,626, dated March 14, 1876; application filed February 17, 1876.

*To all whom it may concern:*

Be it known that I, WM. GORMAN, of New Britain, in the county of Hartford and State of Connecticut, have invented a new and useful Improvement in Handle-Plates for Door-Latches; and I do hereby declare that the following specification, taken in connection with the drawings making a part of the same, is a full, clear, and exact description thereof.

My invention consists in the means by which I combine the escutcheon-plate for the key-hole with the handle-plate of a door-latch, whereby all the advantages which result from having the escutcheon-plate and handle-plate continuous or connected together are preserved, while at the same time the two plates, being, in fact, separable, can be more compactly packed for market.

In the drawings, A represents the handle-plate for the handle $a$, and B the escutcheon-plate for the key-hole $b$. D represents the usual thumb-latch lever. The handle-plate is furnished at its upper end and upon its back side with a pair of lugs or ear-pieces, $c$, and the escutcheon-plate upon its back side and at its lower end has a similar pair of lugs, $d$, the respective pairs being so arranged that one pair can be slip-jointed between the other pair, as shown at Fig. 1. Each pair of lugs or ears extends longitudinally beyond the plate to which it belongs, so that both pairs will, when the two plates are placed as shown at Fig. 1, span the joint, and form together the ears or check-pieces for the thumb-latch lever. Rectangular notches are formed in the abutting ends of the handle-plate and the escutcheon, which, when the two members A and B are put into the relation shown at Fig. 1, will make a four-sided mortise, through which the latch-lever is to pass. The handle-plate and the escutcheon are secured together by a pin, $f$, which passes through coinciding transverse holes $e$ in the two sets of lugs, and this same fastening-pin forms also the joint or fulcrum-pin for the latch-lever.

The mortise for the latch-lever may obviously be elsewhere located, in which case it would require a joint-pin appropriate to itself separate from the fastening-pin for the two members composing the combined latch-plate and escutcheon, but the arrangement shown is the more convenient and desirable one.

A door-knob plate extended so as to form an escutcheon for a key-hole has long been known and used for a door-trimming, and a handle-plate for a door-latch extended to form an escutcheon is also not new. I do not, therefore, claim such structures; but What I do claim as my invention, and desire to secure by Letters Patent, is—

1. The combination of a handle-plate for a door-latch with an escutcheon-plate by means of slip-joint lugs and a pin-fastening, substantially as described.

2. As an article of manufacture, a combined handle-plate for a door-latch and escutcheon-plate made with a slip-joint connection, which forms the check-piece lugs for the thumb-latch lever when a joint-pin is inserted, substantially as described.

WILLIAM GORMAN.

Witnesses:
   H. E. RUSSELL, 2d,
   THEO. E. SMITH.